US007117329B2

(12) United States Patent
Watanabe et al.

(10) Patent No.: US 7,117,329 B2
(45) Date of Patent: *Oct. 3, 2006

(54) METHOD OF MANAGING GENERATION OF BACKUP DATA AND STORAGE CONTROL DEVICE USED THEREFOR

(75) Inventors: Haruaki Watanabe, Tokyo (JP); Kouji Arai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,917

(22) Filed: Nov. 15, 2004

(65) Prior Publication Data

US 2005/0071590 A1 Mar. 31, 2005

Related U.S. Application Data (63) Continuation of application No. 10/632,467, filed on Aug. 1, 2003, now Pat. No. 7,017,019.

(30) Foreign Application Priority Data

Nov. 13, 2002 (JP) ............................. 2002-329806

(51) Int. Cl.
*G06F 12/16* (2006.01)
*G06F 12/08* (2006.01)
(52) U.S. Cl. ..................... 711/162; 707/203; 707/204; 714/6
(58) Field of Classification Search ................ 711/162; 707/204, 203; 714/6
See application file for complete search history.

(56) References Cited

U.S. PATENT DOCUMENTS

| 5,857,208 | A  | 1/1999  | Ofek           |
|-----------|----|---------|----------------|
| 6,101,497 | A  | 8/2000  | Ofek           |
| 6,269,381 | B1 | 7/2001  | St. Pierre et al. |
| 6,353,878 | B1 | 3/2002  | Dunham         |
| 6,397,229 | B1 | 5/2002  | Menon et al.   |
| 6,442,551 | B1 | 8/2002  | Ofek           |
| 6,505,216 | B1 | 1/2003  | Schutzman et al. |
| 6,549,921 | B1 | 4/2003  | Ofek           |
| 6,611,850 | B1 | 8/2003  | Shen           |
| 6,654,752 | B1 | 11/2003 | Ofek           |
| 6,718,352 | B1 | 4/2004  | Dang et al.    |

(Continued)

FOREIGN PATENT DOCUMENTS

JP          04-305742       10/1992

(Continued)

*Primary Examiner*—Hiep T. Nguyen
(74) *Attorney, Agent, or Firm*—Townsend and Townsend and Crew, LLP (57) ABSTRACT

A method of managing a generation of backup data in a storage system is carried out by a storage control device. The backup data is data generated in each of a plurality of pairs originating from one volume. The method includes: receiving, from a host computer, a split request for stopping synchronization between a primary volume and a secondary volume in one of the pairs, and version information about the split; performing a split process in which a backup between the primary volume and the secondary volume of the pair is performed in response to the split request and the synchronization of the pair is stopped; and storing, for each pair, version information of the split process in a predetermined storage section.

20 Claims, 5 Drawing Sheets

U.S. PATENT DOCUMENTS

| | | |
|---|---|---|
| 2001/0013102 A1 | 8/2001 | Tsuchiya et al. |
| 2001/0049776 A1 | 12/2001 | Maeda |
| 2003/0069889 A1 | 4/2003 | Ofek |
| 2003/0088592 A1 | 5/2003 | Innan et al. |
| 2003/0126388 A1 | 7/2003 | Yamagami |
| 2003/0182329 A1 | 9/2003 | Sato |
| 2003/0204583 A1 | 10/2003 | Kaneda et al. |
| 2004/0010732 A1 | 1/2004 | Oka |
| 2005/0010732 A1 | 1/2005 | Boyd et al. |

FOREIGN PATENT DOCUMENTS

| | | |
|---|---|---|
| JP | 09-265419 | 10/1997 |
| JP | 11-134234 | 5/1999 |
| JP | 2000-089917 | 3/2000 |
| JP | 2001-051806 | 2/2001 |
| JP | 2001-159993 | 6/2001 |
| JP | 2002-099418 | 4/2002 |

FIG. 1

| pair number | pair state | primary volume number | secondary volume number | version information |
|---|---|---|---|---|
| 1 | split | 1 | 20 | Ver. 002 |
| | | | | 2002/07/07/15:00 |
| 2 | split | 1 | 25 | Ver. 003 |
| | | | | 2002/07/17/10:12 |
| ⋮ | ⋮ | ⋮ | ⋮ | ⋮ |

METHOD OF MANAGING GENERATION OF BACKUP DATA AND STORAGE CONTROL DEVICE USED THEREFOR

CROSS-REFERENCE TO RELATED APPLICATIONS

The present application claims priority upon Japanese Patent Application No. 2002-329806 filed Nov. 13, 2002, which is herein incorporated by reference.

BACKGROUND OF THE INVENTION

1. Field of the Invention

The present invention relates to a method for performing with a storage control device generation management of backup data that is produced in a plurality of pairs originating from one volume, as well as to a storage control device.

2. Description of Related Art

There are storage systems that are provided with a function for generating duplicate volumes that can be used independently without the intervention of host computer software. Storage control devices used in such storage systems create a secondary volume by copying, for example, a certain logical volume (primary volume) within the storage control device in response to an external instruction, thereby forming a pair of a primary and a secondary volume.

By stopping the synchronization between the primary and the secondary volume in the formed pair and putting the pair into a split state in which each volume can be accessed separately, the resynchronization, for example, between the primary volume and the secondary volume is stopped, and the primary and the secondary volume can be used independently. For example, it becomes possible to carry out such parallel processes as performing a batch task or making a backup with the secondary volume while continuing an online task with the primary volume. As a result, it is possible to enhance the usability of the storage system.

Technology has been proposed to make it easily possible to restore original files to the state they were in at a predetermined time prior to the current time in processing backups. For example, JP H11-134234A proposes a backup and restore method including: a backup copy generating step that generates a backup copy of a given file, and a restore step that restores the original file using the backup copy generated in the backup copy generating step, which further includes, in order to allow a restoring of the file to the state it was in at a given time in the past prior to the current time, a step of designating the execution of the restore step by designating the file to be restored and the amount of time from the current time to the time in the past, and a step of selecting a corresponding backup copy based on the file designated as the file to be restored and the designated amount of time when the execution of the restore step has been designated, and controlling the execution of the restore step.

However, even though this approach "restores original files to the state they were in at a predetermined time prior to the current time," it does not necessarily consider the synchronization of times serving as the basis for each of the processes. For example, the host computer may manage the update times of files, and the storage control device may manage the times when commands are accepted. But since there may be discrepancies between the means for keeping times in each of the devices, and since there are no attempts to synchronize the times between the devices, problems may occur when performing the restore process as explained above.

For example the following case may occur: (1) The clock of the host computer is 10 minutes ahead of the clock of the storage control device. (2) A backup is made when the clock of the host computer shows 2:00 pm. In this case, the time of the backup data will indicate 1:50 pm, which is the time that has been taken from the clock of the storage control device. (3) There is a file whose last update time is 1:55 pm, which is the time that has been taken from the clock of the host computer. (4) Thus, even though the file in (3) is actually older than the backup data, it looks newer when compared with the time of the backup data.

This means that when performing, as in the conventional related art, a restore process for "a predetermined time prior to the current time" using, for example, the time that has been obtained from the storage control device, then there is the possibility that the backup data and the files managed by the host computer are not in the correct chronological order.

Moreover, if the secondary volume is used as the backup of the primary volume, another problem occurs when a plurality of secondary volumes are generated from the same primary volume and managed, namely, the generation management of these secondary volumes is not realized. Under the condition that backup data is generated at a predetermined point in time and stored sequentially in the secondary volumes, when a restore request or the like has been received from the host computer, it was necessary to thoroughly check the content of the data in each of the secondary volumes in order to retrieve the right secondary volume when deciding the secondary volume with which the restore process should be performed. That is to say, there is a possibility that the processing takes more time, so that process efficiency deteriorates, management costs become higher, and the load on the system is increased.

The present invention is based on these considerations, and it is an object thereof to provide a method for generation management of backup data that is more efficient and has better operability.

BRIEF SUMMARY OF THE INVENTION

In order to attain the above-noted object, one aspect of the present invention is a method of managing a generation of backup data in a storage system carried out by a storage control device. The backup data is data that is generated in each of a plurality of pairs originating from one volume. The method comprises: receiving, from a host computer, a split request for stopping synchronization between a primary volume and a secondary volume in one of the pairs, and version information about the split; performing a split process in which a backup between the primary volume and the secondary volume of the pair is performed in response to the split request and the synchronization of the pair is stopped; and storing, for each pair, version information of the split process in a predetermined storage section.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

In the method of managing a generation of backup data mentioned above, it is possible to include: receiving, from the host computer, a restore request for restoring the primary volume to the contents of a secondary volume, and version information indicating a version to be restored; matching this received version information against the version information of the split process that has been stored for each pair in the storage section, and identifying the version information of the split process that matches the received version information; and performing a restore process by copying, to the primary volume, the secondary volume corresponding to the identified version information. In this way, the restore process can be carried out by identifying the data to be restored easily, quickly, and efficiently.

In the method of managing a generation of backup data mentioned above, it is possible to further include: if, upon receiving a restore request from the host computer, version information for that restore request is not received, extracting the version information of the split process that has been stored for each pair in the storage section, and notifying this extracted version information to the host computer; and receiving, from the host computer, version information that has been selected from among the notified version information, and taking that selected version information as the version information for the restore process. With this configuration, it is possible to acquire version information, even when it is not attached to the restore request.

In the method of managing a generation of backup data mentioned above, it is possible to further include: notifying, to the host computer, the version information of the split process corresponding to the split request. With this configuration, the condition of the backup process can be notified.

In the method of managing a generation of backup data mentioned above, the version information may include at least one of time information originating from the host computer and a version ID designated by a user. With this configuration, the generation of the backup data can be designated by time, by ID, or by both.

Another aspect of the present invention may be a storage control device used for managing a generation of backup data, comprising a processor for reading/writing data from/to a primary volume and a secondary volume in each pair in response to a request from a host computer that is connected to the storage control device; and each means for performing the processes mentioned above. With this, it is possible to realize the method for generation management of backup data according to the present invention.

Figure 1:
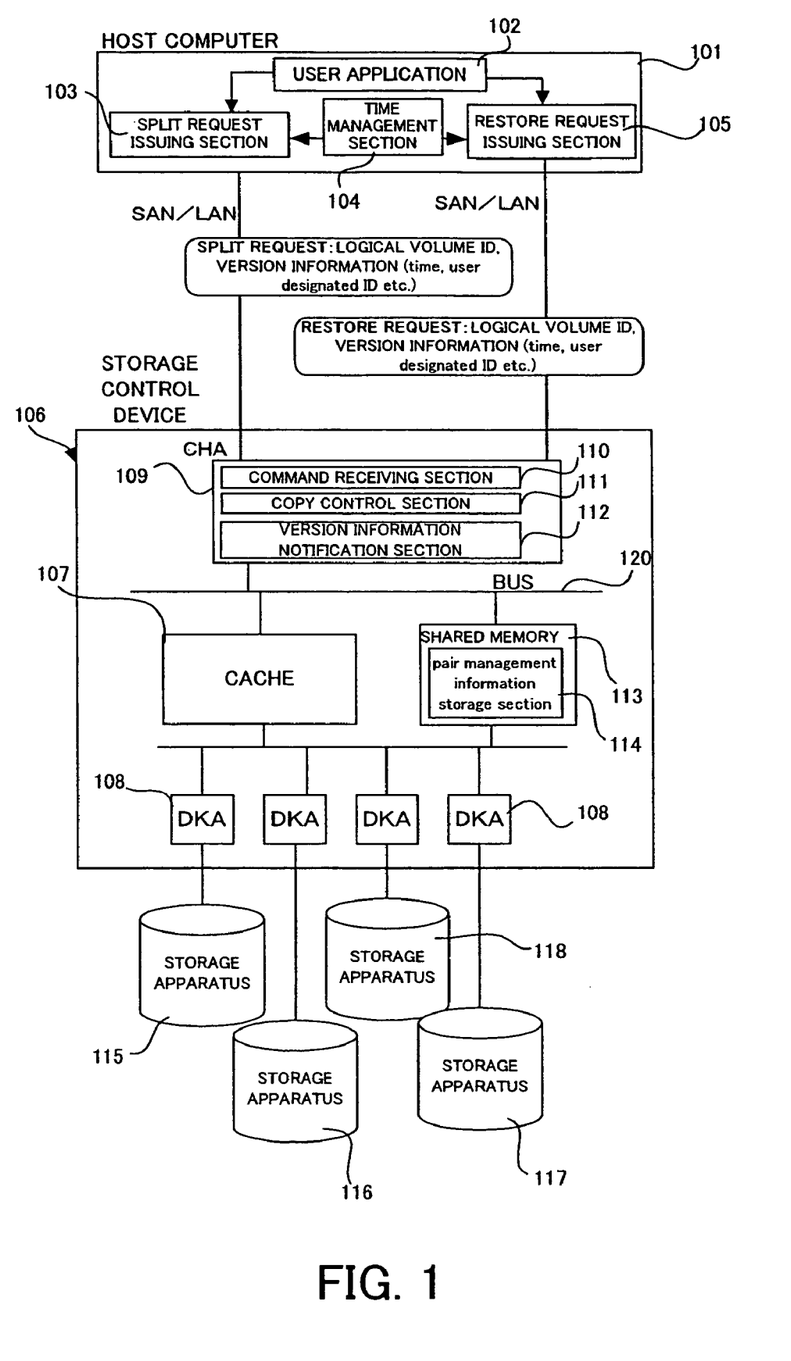
FIG. 1 is a diagram showing the overall configuration of a system illustrating the method of managing a generation of backup data according to an embodiment of the present invention.

FIG. 1 is a diagram showing the overall configuration of a system illustrating the method for generation management of backup data according to this embodiment. This system includes a host computer 101, a storage control device 106, and storage apparatuses 115 to 118. The host computer 101 may be configured of, for example, a mainframe or a personal computer, and is connected to the storage control device 106 via a network, such as a SAN or a LAN. The data communication between the host computer 101 and the storage control device 106 is controlled in an ordinary manner by the network protocols of the SAN or LAN connecting the two, but details concerning these communication procedures have been omitted from the following explanations.

The host computer 101 is provided with a user application 102 that is operated by the user and can serve as an input/output interface, a split request issuing section 103 that issues split requests to the storage control device 106, and a restore request issuing section 105 that issues restore requests also to the storage control device 106. The host computer 101 is further provided with a time management section 104 that can provide time information to the issuing sections 103 and 105.

The split request issuing section 103 and the restore request issuing section 105 are provided in the user application 102 as an API (application program interface) for issuing to the storage control device 106 split requests and restore requests in order to operate the pair(s). For example, there are two ways in which these sections can be provided: (1) they can be incorporated in the application 102 as a library; or (2) they can be provided as programs independent of the application 102 and can be called by the application 102. The time management section 104 is provided by the OS (operating system) in forms of a library or a system call. The split request issuing section 103 and the restore request issuing section 105 get hold of the time managed by the OS using the library and/or through the system call.

The split request issuing section 103 and the restore request issuing section 105 may obtain the time as parameters from the application 102. In this case, the application 102 gets hold of the time managed by the OS using the library and/or the system call provided by the OS.

If there are several host computers 101, it is preferable that the time in each of the host computers 101 is in synchronization. Therefore, in this case, the time is regularly synchronized at predetermined intervals, such as per second or per minute, using NTP (network time protocol), for example.

(Note that the split request issuing section 103 and the restore request issuing section 105 may function as the RAID manager.)

Needless to say, the storage control device 106 is provided with a CPU and an input/output interface to the host computer 101 (neither is shown in the drawings), and is further provided with a cache memory 107, a shared memory 113, a channel adapter (denoted as "CHA") 109 carrying out cache control and data transfer control, and disk adapters (denoted as "DKA") 108 controlling the input/output to/from the storage apparatuses. It should be noted that the channel adapter 109 includes a command receiving section 110 that receives commands from the host computer 101, a copy control section 111 that controls the copying process between primary and secondary volumes during backup and restore, and a version information notification section 112 that notifies version information (explained below) concerning each of the secondary volumes to the host computer.

The storage control device 106 transmits various kinds of control information, which is recorded, for example, in the shared memory 113 in response to various kinds of requests from the host computer 101, via a bus 120 that connects the various devices, to the disk adapters 108 of the storage apparatuses 115 to 118. It should be noted that this control information is used by the processors provided in each of the channel adapter 109 and the disk adapters 108.

The storage apparatuses are disk arrays serving as storage devices. FIG. 1 shows a plurality of storage apparatuses 115 to 118. These storage apparatuses 115 to 118 are connected to the disk adapters 108 of the storage control device 106 through, for example, SCSI interfaces. The storage control device 106 performs the management of logical units that are organized using physical storage areas provided by the plurality of storage apparatuses 115 to 118 as well as management of logical storage areas that are provided by these storage apparatuses using data blocks partitioned in the logical units. The logical units are identified by LUNs (logical unit numbers), and data blocks are designated by block addresses.

Figure 2:
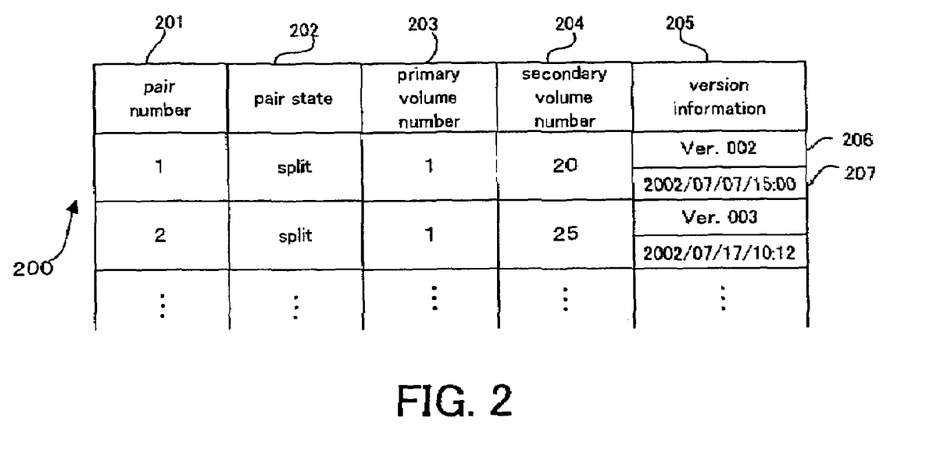
FIG. 2 is a diagram illustrating an example of a pair management information table according to this embodiment.

FIG. 2 is a diagram illustrating an example of a pair management information table according to the present embodiment. When the storage control device 106 generates a secondary volume for storing the backup data for a primary volume, the storage control device 106 has to manage the information tying together the pair of primary and secondary volumes (pair management information 200). For this, a pair number 201 is set for each pair. To each pair number 201 are correlated a pair state 202, a primary volume number 203, a secondary volume number 204, and version information 205, which are updated and managed.

The following effects are achieved by providing the version information 205 in the storage control device 106:

(a) Generally, several host computers 101 will be connected to the storage control device 106. Especially in such an environment, it is possible to manage information in a centralized fashion and thus it becomes easy to share information.

(b) Since the section that manages information is provided in the storage control device 106, there will be no load on the host computer 101.

The version information 205 indicates the version of the backup and the split process performed between primary and secondary volumes of each pair in response to a split request by the host computer 101. This information includes a version number 206 that is determined as appropriate by, for example, the user or the storage control device 106, as well as a time stamp 207 serving as time information about the time at which that process was performed. It should be noted that the time stamp 207 originates from the time management section 104 of the host computer 101, and serves as an opportunity (timing) and/or a basis for a possible restore process etc.

The pair management information 200 is stored as control information in a pair management information storage section 114 of the shared memory 113. States that can be set as the pair state 202 for each pair include, for example: a pending state, which is the state while duplication is being performed (an initial copy is being made) between the primary volume and the secondary volume; a duplex state, which is the state after the initial copy has finished; and a split state, in which the primary and the secondary volume are unpaired and the secondary volume becomes accessible. Taking for example the pair with the pair number "1" in FIG. 2, a pair has been set between the primary volume with the volume number "1" and the secondary volume with the volume number "20," and this pair is in the split state, which means that the primary and secondary volumes have been unpaired and the secondary volume has become accessible.

Figure 3:
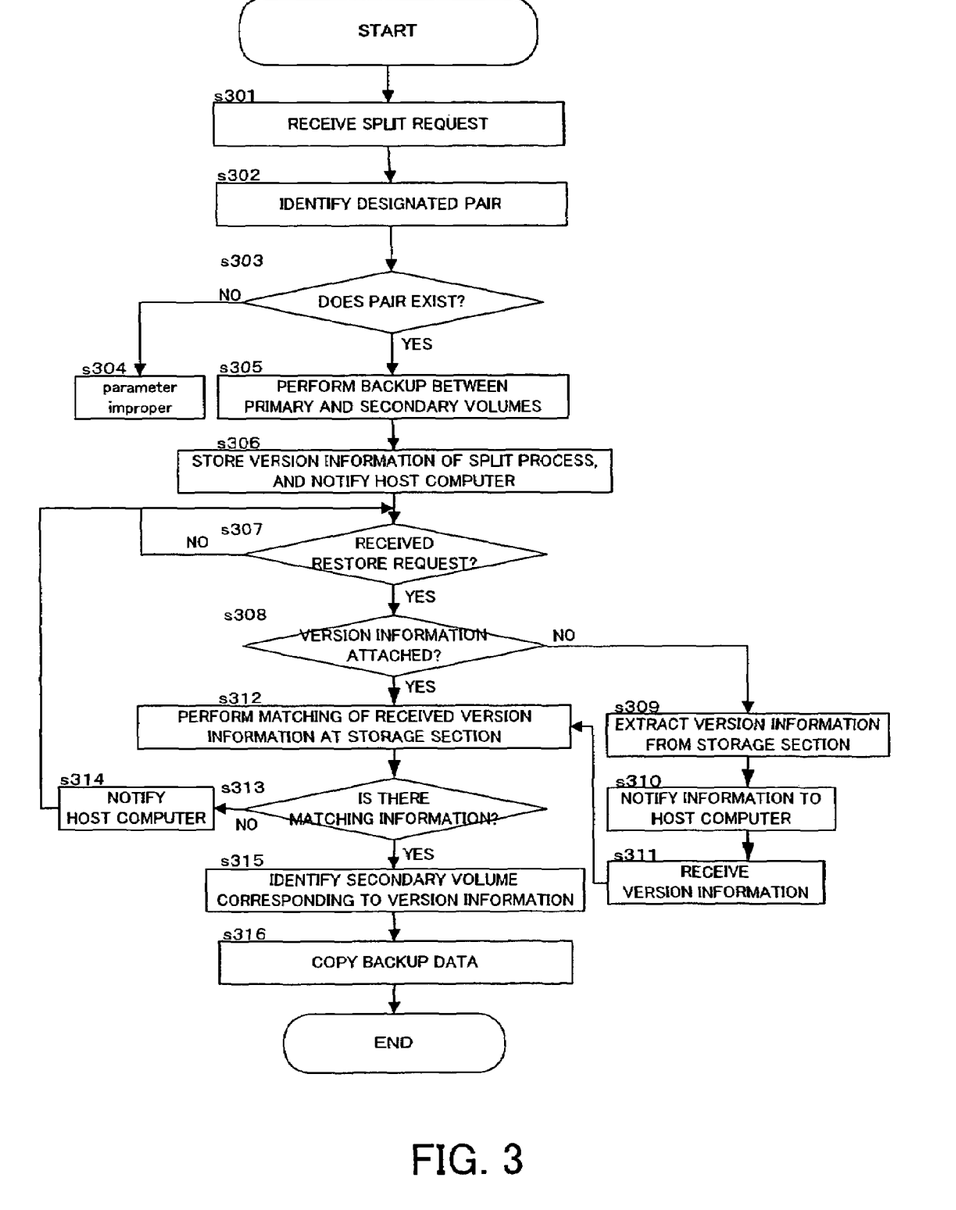
FIG. 3 is a flow chart illustrating the method for managing a generation of backup data of this embodiment.
Figure 4:
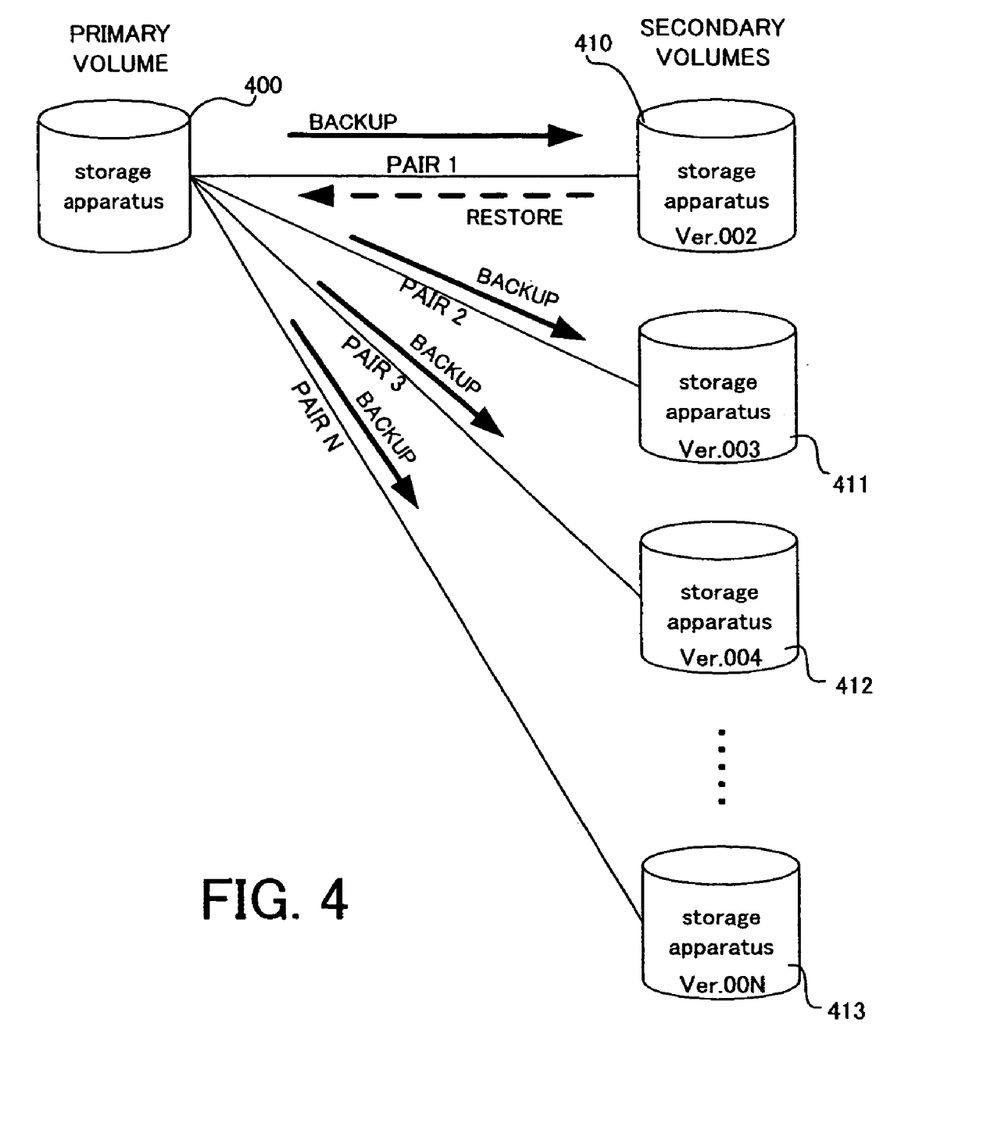
FIG. 4 is a diagram illustrating a plurality of pair configurations in the method of managing a generation of backup data of this embodiment.

FIG. 3 is a flow chart illustrating the method for generation management of backup data of this embodiment. FIG. 4 is a diagram illustrating a plurality of pair configurations in the method for generation management of backup data of this embodiment. The following is an explanation of a method for generation management of backup data according to the present invention, which is performed on a system with the above-described configuration. Here, it is assumed that the storage apparatuses serving as the secondary volumes 410 to 413 each constituting the pairs 1 to N, respectively, have been generated for the storage apparatus serving as the primary volume 400, as shown in FIG. 4.

Figure 5:
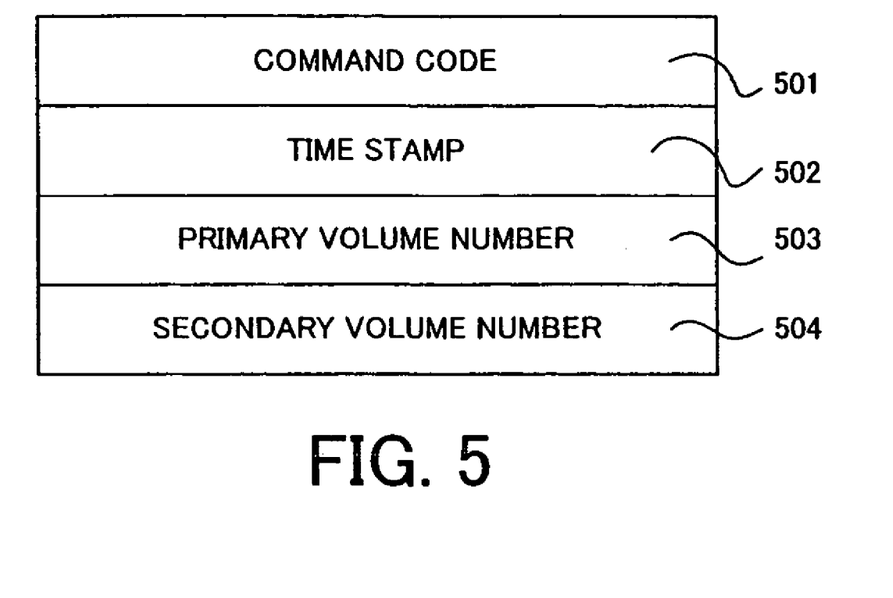
FIG. 5 shows example No. 1 of information parameters sent from the host computer to the storage control device.
Figure 6:
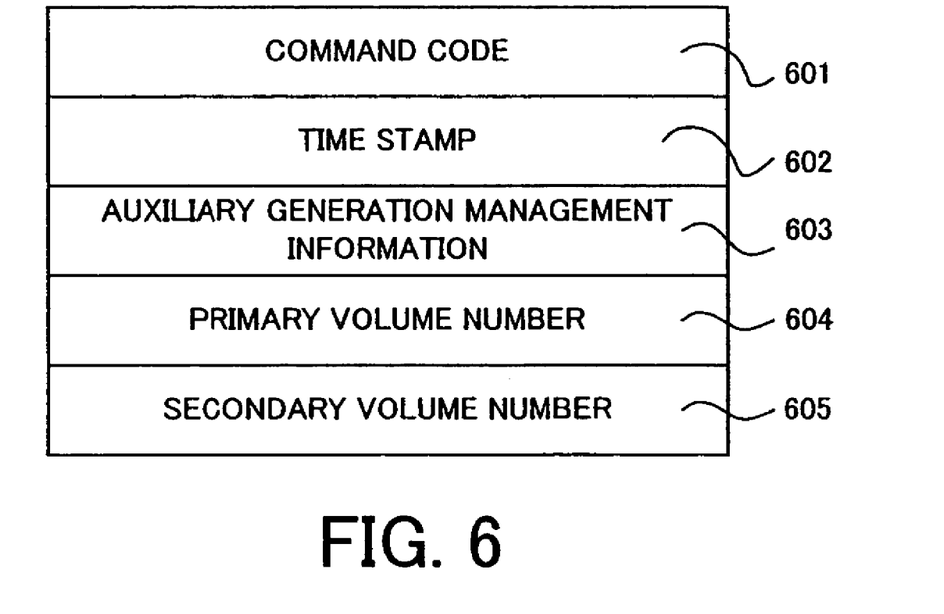
FIG. 6 shows example No. 2 of information parameters sent from the host computer to the storage control device.

Let us assume that the host computer 101 issues a split request to stop the synchronization between the primary and secondary volumes of a pair, together with the version information for that split, to the storage control device 106. In this split request are described, for example, the version information and the ID(s) of the logical volume(s) for which the split is requested. FIG. 5 shows a parameter example 1 of information that is sent from the host computer 101 to the storage control device 106. As shown in FIG. 5, the parameters in this example are a command code 501 (or restore request) in which the split request is written, a time stamp 502 originating from the time management section 104 of the host computer 101, and a primary volume number 503 and a secondary volume number 504 of the pair subject to the process. Alternatively, the parameters may also be a command code 601 (or restore request) in which the split request is written, a time stamp 602 originating from the time management section 104 of the host computer 101, auxiliary generation management information 603 about the data to be backed up or the development version of an application program for example, and a primary volume number 604 and a secondary volume number 605 of the pair subject to the process, as shown by the parameter example 2 shown in FIG. 6.

The storage control device 106 receives the split request with the command receiving section in the channel adapter 109 (s301). Then, the designated pair is identified from among the pairs 1 to N, based on the logical volume ID(s) specifying the pair (s302). If the designated pair cannot be identified, it is concluded that the designated pair does not exist (s303: NO), and a message stating that the parameters are improper is returned to the host computer 101 (s304).

On the other hand, if the designated pair could be identified (s303: YES), then a copy from the primary volume to the secondary volume of that pair is made with the copy control section 111, thus carrying out a backup process (s305). In FIG. 4, the designated pair is, for example, the pair 1, and data is copied from the primary volume 400 to the secondary volume 410 of that pair.

When the backup has been performed, then the version information designated by the host computer 101 is associated with that pair 1 for example, and stored in the pair management information storage section 114 (s306). This version information may be about the date and time when the backup was performed, or it may be a version number indicating the generation of the backup. In the pair management information 200 of FIG. 2 explained above, for example, the version information 205 for pair 1 holds the version number 206 indicating "Ver. 002", and the time stamp 207 indicating "2002/07/07/15:00." This version information may also be notified to the host computer 101.

For example, if the development of an application program is carried out on the primary volume 400, then a backup needs to be performed at predetermined time intervals or for each version of the developed program. Consequently, the above-described backup process is repeated at appropriate timings, and even though the content may not have changed, secondary volumes 410 to 413 are generated, in which at least the version information differs.

It should be noted that the storage control device 106 may generate version information, even when the version information is not designated by the host computer 101 with the split request.

With the foregoing, the synchronization between the primary volume and the secondary volume is lost, and when the application has used the primary volume for a predetermined period time, its contents will have changed. If at a certain time the need comes to restore (reconstitute) the primary volume 400 to one of the states of the secondary volumes 410 to 413 constituting the pairs 1 to N, then the host computer 101 issues a restore request. The information sent from the host computer 101 to the storage control device 106 with this restore request is made of the parameter information shown in FIG. 5 or FIG. 6 explained above.

The storage control device 106 receives the restore request, together with the version information that indicates the version desired to be restored, with the command receiving section 110 (s307: YES). If there is no restore request, then the split state is continued (s307: NO). If version information is attached to the received restore request (s308: YES), then this version information is matched with the version information 205 of the split processes stored in the pair management information processing section 114 (s312).

On the other hand, if no version information is included in the restore request (s308: NO), then the version information stored in the pair management information storage section 114 is extracted therefrom (s309), and this list is sent to the host computer 101 (s310). The user of the host computer 101 selects the suitable version information of a split process from this list, and returns the selected version information to the storage control device 106. The storage control device 106 receives this version information (s311), and uses it for the matching process in Step s312.

If a pair corresponding to the received version information has been found among the pair management information 200 (s313: YES), then the corresponding secondary volume is identified (s315). If, on the other hand, no corresponding information is found (s313: NO), then this fact is notified to the host computer 101 (s314), and the processing returns to the step at which the restore request was received. For example, if the version information included in the restore request is "Ver. 002," then the "pair 1" with that version number is found in the pair management information 200 stored in the pair management information storage section 114. Thus, the secondary volume 410, whose secondary volume number is "20," can be identified as constituting the pair 1.

When the secondary volume 410 corresponding to that version information "Ver. 002" has been identified, then the copy control section 111 in the storage control device 106 copies the secondary volume 410 to the primary volume 400, and performs the restore process (s316).

<Other Considerations>

In the above working example, the host computer 101 issues split requests and backup requests, but it is also possible to adopt a configuration in which the storage control device 106 issues these requests.

Moreover, the storage control device 106 and the storage apparatuses 115 to 118 have been provided separately, but it is also possible to integrate them into one device.

The storage apparatuses 115 to 118 are not limited to disk arrays, and semiconductor disks and other kinds of storage devices can also be applied.

Moreover, by limiting the devices that can access the storage control device 106 to the host computer 101, or controlling the accessed contents according to, for example, attributes of data packets, it is possible to ensure the security of the storage control device 106. It should be noted that in accordance with the present invention, the processing for the generation management of backup data is carried out inside the storage control device 106, thus ensuring a high level of security.

Furthermore, an example has been explained for the case in which the storage control device 106 performs backup and restore processes on a logical unit basis, but needless to say, the present invention can also be applied to cases in which these processes are performed on a physical unit basis.

This embodiment of the present invention displays the following advantageous effects.

The present invention realizes generation management for a plurality of secondary volumes. In the present invention, version information of backups is managed reliably, and restore processes based on the secondary volume for the designated version can be carried out easily, quickly and efficiently in response to restore requests from a host computer. Moreover, the generation management is performed entirely by the storage control device without spending the host computer's resources, so that not only the management costs are reduced and management efficiency is improved, but accesses from external sources can be suppressed as appropriate, thereby increasing security. In addition, by using the time given by the host computer, it is possible to eliminate conflicts in the chronological order between the host computer and the storage control device, and the backup data can be managed and handled in their correct chronological order.

With the present invention, it is possible to provide a method for generation management of backup data.

Although the preferred embodiment of the present invention has been described in detail, it should be understood that various changes, substitutions and alterations can be made therein without departing from spirit and scope of the inventions as defined by the appended claims.

What is claimed is:

1. A method of managing backup data in a storage system carried out by a storage control device, said backup data being generated in each of a plurality of pairs originating from one volume, said method comprising:
   receiving, from a host computer,
      a split request for stopping synchronization between a primary volume and a secondary volume in one of said pairs, and
      version information about a split process corresponding to said split request;
   performing said split process in which a backup between said primary volume and said secondary volume of said pair is performed in response to said split request and the synchronization of said pair is stopped;

storing, for said pair, said version information of said split process in a predetermined storage section;

receiving, from said host computer, a restore request for restoring said primary volume to contents of said secondary volume, without receiving version information for said restore request;

extracting said version information of the split process that has been stored for each of said plurality of pairs in said storage section, and notifying the extracted version information to said host computer;

receiving, from said host computer, version information that has been selected from among said notified version information, and taking the selected version information as the version information for a restore process corresponding to the received restore request.

2. A method of managing backup data according to claim 1, further comprising:

comparing the received version information with said version information of the split process that has been stored for each of said plurality of pairs in said storage section, and identifying the version information of the split process that matches said received version information; and performing a restore process by copying, to said primary volume, said secondary volume corresponding to the identified version information.

3. A method of managing backup data according to claim 2, further comprising:

if there is no match between the version information of the split process and said received version information, notifying said host computer.

4. A method of managing backup data according to claim 1, further comprising:

resetting said version information of the split process corresponding to said split request; and notifying, to said host computer, said version information of the split process corresponding to said split request.

5. A method of managing backup data according to claim 1, wherein said version information includes at least one of:

time information originating from said host computer, and a version ID designated by a user.

6. A storage control device used for managing backup data, said backup data being generated in each of a plurality of pairs originating from one volume, said storage control device comprising:

a processor configured to read/write data from/to a primary volume and a secondary volume in each of said plurality of pairs in response to a request from a host computer that is connected to said storage control device;

a receiving section configured to receive, from said host computer, a split request for stopping synchronization between a primary volume and a secondary volume in one of said pairs, and version information about a split process corresponding to said split request; and a control section configured to perform said split process in which a backup between said primary volume and said secondary volume of said pair is performed in response to said split request and the synchronization of said pair is stopped;

wherein said processor is configured to store, for said pair, said version information of said split process in a predetermined storage section;

wherein said receiving section is configured to receive, from said host computer, a restore request for restoring said primary volume to contents of said secondary volume, without receiving version information for said restore request;

wherein said processor is configured to extract said version information of the split process that has been stored for each of said plurality of pairs in said storage section;

wherein said storage control device further comprises a notification section configured to notify the extracted version information to said host computer; and wherein said receiving section is configured to receive, from said host computer, version information that has been selected from among said notified version information, and to take the selected version information as the version information for a restore process corresponding to the received restore request.

7. A storage control device according to claim 6, wherein said processor is configured to compare the received version information with said version information of the split process that has been stored for each of said plurality of pairs in said storage section, and identify the version information of the split process that matches said received version information; and said control section is configured to perform a restore process by copying, to said primary volume, said secondary volume corresponding to the identified version information.

8. A storage control device according to claim 7, wherein if there is no match between the version information of the split process and said received version information, said notification section notifies said host computer.

9. A storage control device according to claim 6, wherein said notification section is configured to reset said version information of the split process corresponding to said split request and to notify, to said host computer, said version information of the split process corresponding to said split request.

10. A storage control device according to claim 6, wherein said version information includes at least one of:

time information originating from said host computer, and a version ID designated by a user.

11. A method of managing backup data in a storage system carried out by a storage control device, said backup data being generated in each of a plurality of pairs originating from one volume, a backup between a primary volume and a secondary volume of said pair has been performed in response to a split request with corresponding version information of a split process and the synchronization of said pair is stopped, said version information being stored in a predetermined storage section, said method comprising:

receiving, from said host computer, a restore request for restoring said primary volume to contents of said secondary volume, without receiving version information for said restore request;

extracting said version information of the split process that has been stored for each of said plurality of pairs in said storage section, and notifying the extracted version information to said host computer;

receiving, from said host computer, version information that has been selected from among said notified version information, and taking the selected version information as the version information for a restore process corresponding to the received restore request.

12. A method of managing backup data according to claim 11, further comprising:

comparing the received version information with said version information of the split process that has been stored for each of said plurality of pairs in said storage section, and identifying the version information of the split process that matches said received version information; and performing a restore process by copying, to said primary volume, said secondary volume corresponding to the identified version information.

13. A method of managing backup data according to claim 12, further comprising:

if there is no match between the version information of the split process and said received version information, notifying said host computer.

14. A method of managing backup data according to claim 11, further comprising:

resetting said version information of the split process corresponding to said split request; and notifying, to said host computer, said version information of the split process corresponding to said split request.

15. A method of managing backup data according to claim 11, wherein said version information includes at least one of:

time information originating from said host computer, and a version ID designated by a user.

16. A storage control device used for managing backup data, said backup data being generated in each of a plurality of pairs originating from one volume, a backup between a primary volume and a secondary volume of said pair has been performed in response to a split request with corresponding version information of a split process and the synchronization of said pair is stopped, said storage control device comprising:

a storage section configured to store said version information of the split process;

a processor configured to read/write data from/to a primary volume and a secondary volume in each of said plurality of pairs in response to a request from a host computer that is connected to said storage control device, wherein said processor is configured to extract said version information of the split process that has been stored for each of said plurality of pairs in said storage section;

a notification section configured to notify the extracted version information to said host computer;

a receiving section configured to receive, from said host computer, a restore request for restoring said primary volume to contents of said secondary volume, without receiving version information for said restore request;

wherein said receiving section is configured to receive, from said host computer, version information that has been selected from among said notified version information, and to take the selected version information as the version information for a restore process corresponding to the received restore request.

17. A storage control device according to claim 16, wherein said processor is configured to compare the received version information with said version information of the split process that has been stored for each of said plurality of pairs in said storage section, and identify the version information of the split process that matches said received version information; and further comprising a control section configured to perform a restore process by copying, to said primary volume, said secondary volume corresponding to the identified version information.

18. A storage control device according to claim 17, wherein if there is no match between the version information of the split process and said received version information, said notification section notifies said host computer.

19. A storage control device according to claim 16, wherein said notification section is configured to reset said version information of the split process corresponding to said split request and to notify, to said host computer, said version information of the split process corresponding to said split request.

20. A storage control device according to claim 16, wherein said version information includes at least one of:

time information originating from said host computer, and a version ID designated by a user.

* * * * *